(12) United States Patent
Sokolov et al.

(10) Patent No.: US 9,367,883 B2
(45) Date of Patent: Jun. 14, 2016

(54) SHARED PLAYLIST SYNCHRONIZATION

(71) Applicant: MICROSOFT TECHNOLOGY LICENSING, LLC, Redmond, WA (US)

(72) Inventors: Boris Sokolov, Seattle, WA (US); Karim Jouini, Paris (FR); Guillaume Velez, Paris (FR); Marie-Aurélie Nef, Boulogne-Billancourt (FR); Eddy Cizeron, Paris (FR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 235 days.

(21) Appl. No.: 13/767,574

(22) Filed: Feb. 14, 2013

(65) Prior Publication Data
US 2013/0325807 A1 Dec. 5, 2013

Related U.S. Application Data

(60) Provisional application No. 61/655,406, filed on Jun. 4, 2012.

(51) Int. Cl.
| | |
|---|---|
| *G06F 7/02* | (2006.01) |
| *G06F 17/30* | (2006.01) |
| *G06Q 50/18* | (2012.01) |
| *G06Q 30/02* | (2012.01) |
| *H04L 29/06* | (2006.01) |

(52) U.S. Cl.
CPC ........ *G06Q 50/184* (2013.01); *G06F 17/30053* (2013.01); *G06F 17/30106* (2013.01); *G06F 17/30174* (2013.01); *G06F 17/30575* (2013.01); *G06Q 30/0256* (2013.01); *H04L 65/4084* (2013.01); *H04L 65/60* (2013.01)

(58) Field of Classification Search
CPC ............... G06F 17/30575; G06F 17/30174; G06F 17/30371; G06F 17/3023; G06F 17/30374; G06F 17/30377
See application file for complete search history.

(56) References Cited

U.S. PATENT DOCUMENTS 6,944,642 B1 * 9/2005 Hopmann et al. ............ 709/203
7,725,431 B2 5/2010 Myllyla et al.
(Continued)

OTHER PUBLICATIONS

"Shared Playlist Editing", Retrieved at <<http://www.enco.com/Help/00203shared.htm>>, Oct. 29, 2010, pp. 2.
(Continued)

*Primary Examiner* — Bruce Moser
(74) *Attorney, Agent, or Firm* — Bryan Webster; Judy Yee; Micky Minhas

(57) ABSTRACT

Various embodiments relating to synchronizing changes to a shared list of items between different devices are provided. In one embodiment, a first set of change operations for a first version of a shared list may be received from a first device. The first set of change operations may be performed on the first version of the shared list to produce a second version of the shared list. A second set of change operations for the first version of the shared list may be received from a second device. The second set of change operations may be performed on the second version of the shared list to produce a third version of the shared list that maintains changes that are made by the first set of change operations but that are not made by the second set of change operations.

20 Claims, 9 Drawing Sheets

(56) References Cited

U.S. PATENT DOCUMENTS

| | | |
|---|---|---|
| 8,150,937 B2 | 4/2012 | Ng et al. |
| 8,185,579 B2 | 5/2012 | Svendsen |
| 8,484,561 B1 * | 7/2013 | Lemonik ................. G06F 17/24 715/255 |
| 8,583,614 B1 * | 11/2013 | Dilts ................. G06F 17/30575 707/695 |
| 2005/0015713 A1 | 1/2005 | Plastina et al. |
| 2005/0108300 A1 * | 5/2005 | Findleton et al. ............. 707/203 |
| 2008/0168183 A1 * | 7/2008 | Marcy et al. .................. 709/248 |
| 2011/0093597 A1 * | 4/2011 | Hopmann et al. ............. 709/226 |
| 2011/0158260 A1 * | 6/2011 | Piwonka ........... G06F 17/30174 370/503 |
| 2011/0320407 A1 * | 12/2011 | Augustine et al. ............ 707/636 |
| 2012/0117026 A1 * | 5/2012 | Cassidy ........................ 707/634 |
| 2012/0158656 A1 * | 6/2012 | Hampton et al. ............. 707/634 |
| 2012/0239621 A1 | 9/2012 | Savenok et al. |
| 2013/0097117 A1 * | 4/2013 | Lasky et al. ................... 707/624 |
| 2013/0212112 A1 * | 8/2013 | Blom et al. ................... 707/741 |

OTHER PUBLICATIONS

Novik, et al., "Peer-to-Peer Replication in WinFS", Retrieved at <<http://www.google.co.in/url?sa=t&rct=j&q=&esrc=s& source=web&cd=4&ved=0CDcQFjAD& url=http%3A%2F%2Fresearch.microsoft. com%2Fpubs%2F65604%2Ftr-2006-78.doc& ei=95msUKeuHIOzrAeAs4GIBw&usg=AFQjCNEkLGSW-SBhhmUa3H5L6xGx65v5_A& sig2=b0CYv1K9CYHRP55UKfNHbQ&cad=rja>>, Jun. 2006, pp. 1-17.

* cited by examiner

SHARED PLAYLIST SYNCHRONIZATION

CROSS REFERENCE TO RELATED APPLICATIONS

This application claims priority to U.S. Provisional Patent Application No. 61/655,406, filed Jun. 4, 2012 and entitled MULTI-SCREEN MEDIA DELIVERY, the entirety of which is hereby incorporated herein by reference.

BACKGROUND

A shared list of items that is stored in a network cloud may be accessed and edited by multiple different client devices. In some cases, edits to a shared list performed at one device may conflict with edits to the shared list that are performed at another device. One method of handling such conflicts is by only maintaining the most recently received edits and discarding any older versions of edits received from a different device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Various embodiments relating to synchronizing changes to a shared list of items between different devices are provided. In one embodiment, a first set of change operations for a first version of a shared list may be received from a first device. The first set of change operations may be performed on the first version of the shared list to produce a second version of the shared list. A second set of change operations for the first version of the shared list may be received from a second device. The second set of change operations may be performed on the second version of the shared list to produce a third version of the shared list that maintains changes that are made by the first set of change operations but that are not made by the second set of change operations.

DETAILED DESCRIPTION

The present disclosure relates to mechanisms for effectively handling multiple client devices editing a shared list (e.g., an ordered music playlist of music tracks and/or music videos) that is stored at a synchronization service computing machine. More particularly, the present disclosure relates to mechanisms that take into account all add/delete operations for the shared list that are made by different client devices, while respecting ordering of items in the shared list when possible. In particular, embodiments of this disclosure may use intelligent and granular algorithms that process sets of change operations from multiple devices for the same shared list in an order in which they are received by the synchronization service computing machine. Furthermore, each change operation within a set of change operations may be processed individually. Moreover, the synchronization algorithms may allow for changes to a shared list that are made at a device that is offline or online to be taken into account when the changes are received by the synchronization service computing machine. Accordingly, a final result of the shared playlist may be produced that respects the changes made at each device and aligns with a user's expectations.

Figure 1:
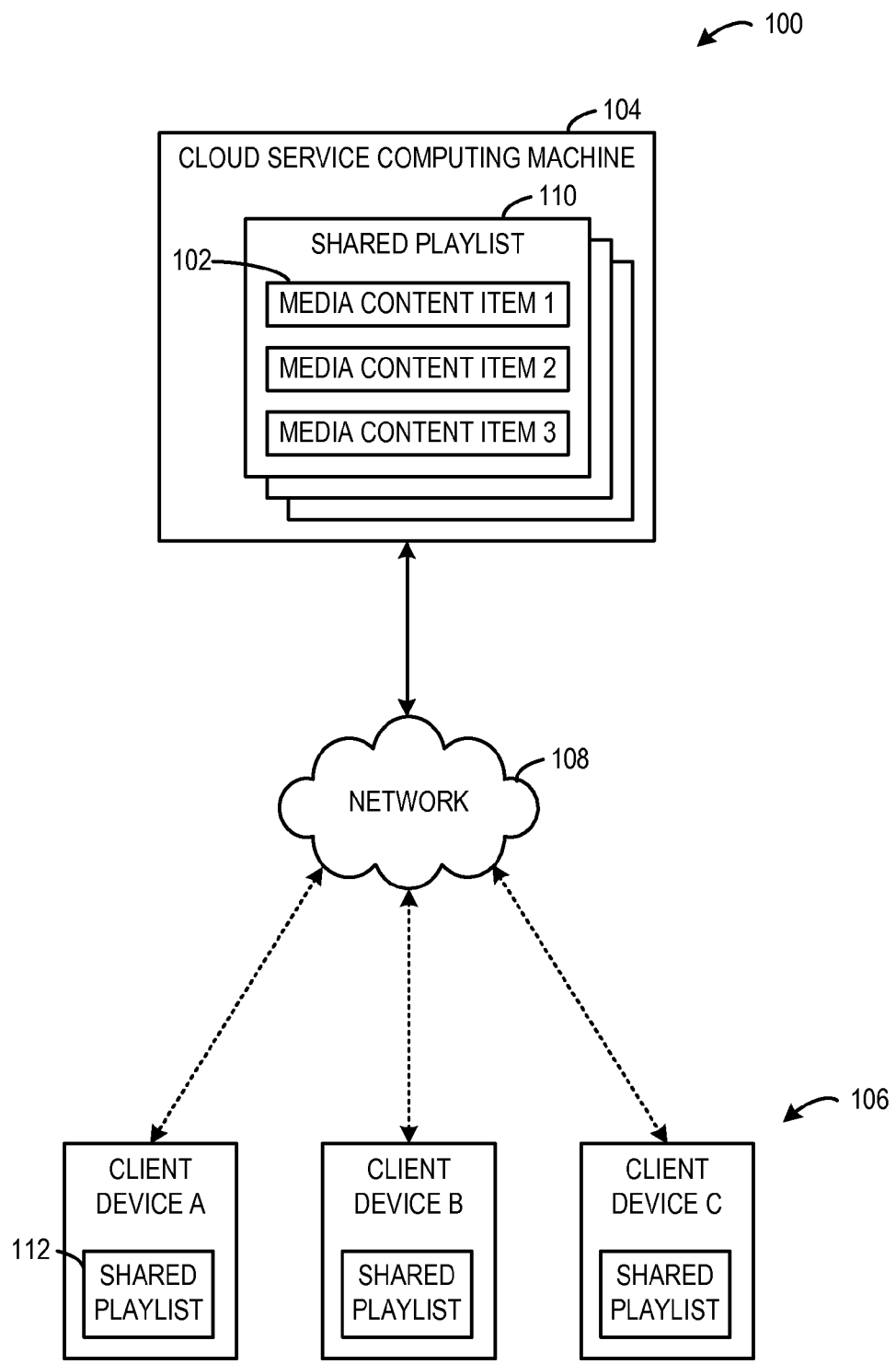
FIG. 1 shows a computing system in accordance with an embodiment of the present disclosure.

FIG. 1 shows a computing system 100 in accordance with an embodiment of the present disclosure. Computing system 100 is configured to provide media content items 102 (e.g., songs, movies, games, and the like) from one or more synchronization service computing machines 104 to a plurality of different client devices 106 over a network 108, such as the Internet. As illustrated, computing system 100 includes client device A, client device B, and client device C that each may access media content items from synchronization service computing machine 104. It should be understood that virtually any number of different client devices may be used to access media content items from virtually any number of different synchronization service computing machines without departing from the scope of this disclosure. Non-limiting examples of client devices may include desktop computers, laptop computers, smart phones, tablet computers, gaming consoles, set-top boxes, networked televisions, mobile devices, and any other suitable computing device.

Synchronization service computing machine 104 may be configured to store, track, and allow access to media content items 102 (e.g., a user's music collection) across the plurality of devices 106. The media content items may be persistently or temporarily downloaded for immediate playback (i.e., streaming), and/or the media content items may be persistently downloaded for playback at a later time. Various media content items 102 may be organized into shared lists 110. For example, the shared lists may be ordered playlists of music tracks or music videos. In some instances, the shared playlists may include pointers that point to a storage location of media content items and the shared playlists may not actually include media data of the media content items in the shared playlists. Although the present description focuses on ordered playlists of media content items, it will be appreciated that the concepts disclosed herein may apply to any suitable list (e.g., a shared grocery list, a gift registry, a movie rental queue, etc.).

The shared lists 110 may be curated by a user via change operations that may be performed at any given device. In particular, a user may perform a set of change operations for a local version 112 of a shared list stored locally at the device. A set of change operations may include one or more change operations that are performed at a device for a version of a shared list to produce an updated version of the shared list. Non-limiting examples of change operations include a delete item operation, an add item operation, and a re-order item operation. The delete item operation may be performed to delete a designated item from the shared list. The add item operation may be performed to add an item to the end of the shared list. The re-order item operation may be performed to place a selected item after a designated item or before a designated item in the shared list.

The set of change operations may be sent to synchronization service computing machine 104 to synchronize with a version of the shared list stored at the synchronization service computing machine and further with other versions of the shared list stored at other devices. Accordingly, the shared list may be synchronized across all devices that are connected to the synchronization service computing machine (e.g., online). In some embodiments, synchronization service computing machine 104 may be configured to synchronize a shared list via a plurality of application programming interfaces (APIs). For example, a first API may be configured to send all updates for a shared list from the synchronization service computing machine to a device. A second API may be configured to push all local changes the user has initiated at a local device to the synchronization service computing machine.

As a user can edit a shared list via change operations on multiple devices, the changes sent from each device to the synchronization service computing machine can contain different sets of instructions that may cause conflicts in editing the shared list. Accordingly, the synchronization service computing machine may be configured to processes each set of change operations for a shared list in an order in which they are received at the synchronization service computing machine. Furthermore, within each set of change operations, each change operation may be processed individually. Moreover, in some embodiments, each change operation of a set of change operations may be performed sequentially. As each change operation is processed, a version of the shared list may be updated and new change operations may be applied to the updated version of the shared list. Accordingly, changes that are made by an older set of change operations but that are not made by a more recent set of change operations may be maintained in the updated version of the shared list. In other words, since each change operation is treated individually, the final ordering of the playlist is merged based on the actions performed at each of the different devices.

Furthermore, the synchronization service computing machine may be configured to process or perform change operations within a set of change operations according to a specific order. In particular, the synchronization service computing machine may be configured to process all delete item operations prior to processing all add item operations and re-order item operations. If an item designated by a delete item operation is no longer present in the current version of the shared list, then the delete item operation is ignored. Note that the delete item operation may be performed even if an item has changed position in the shared list as a result of a previously performed re-order operation.

Once all delete item operations are processed, the synchronization service computing machine may be configured to process all add item operations prior to processing all re-order item operations. The add item operation may be performed to add an item to the end of the shared list. By adding an item to the end of the shared list, the add item operation can be performed regardless of a current state of the shared list without disrupting ordering of the shared list. Note that to add an item at a different position in the shared list, a combination of an add item operation and a re-order item operation may be performed.

Once all add item operations are processed, the synchronization service computing machine may be configured to process all re-order item operations. Performing the re-order item operation on an item of the shared list may include placing the item after a designated item and/or placing the item before a designated item in the shared list. The re-order operation may honor a relative order of items in the shared list, but may not guarantee an exact position of an item in the shared list due to potential changes made by previously processed change operation that affect a state of the shared list. For example, if a re-order operations request that item A be followed by item B, the re-order operation can only guarantee that item A will come before item B in the shared list, but it cannot guarantee that item A and item B will be adjacent in the shared list, because, for example, item C could be placed between item A and item B by a previous set of change operations that was processed after the re-order operation was made at a device but before it was received by the synchronization service computing machine.

It will be appreciated that change operations may be handled locally at a device in the same order as handled by the synchronization service computing machine. In particular, delete item operations may be performed prior to performing add item operations and re-order item operations, and add item operations may be performed prior to performing re-order item operations.

In some embodiments, each item in a shared list may be assigned an identifier that may be used for tracking of a relative position within the shared list. The identifier may be used as a reference for change operations. For example, an identifier may keep track of each relative position of an item in the shared list each time the relative position is changed as a result of a change operation. Further, the identifier may be used for a reference point for add item operations.

In some embodiments, a user may edit a local version of a shared list stored at a first device while the first device is not connected to the synchronization service computing machine (e.g., offline). This may cause the local version of the shared list to differ from the version of the shared list stored at the synchronization service computing machine. In the meantime when the first device is offline, the version of the shared list stored at the synchronization service computing machine may be updated by the user from a second device that is connected to the synchronization service computing machine (e.g., online). Furthermore, when the first device connects to the synchronization service computing machine (e.g., comes online), the synchronization service computing machine may receive the set of change operations from the first device for the previous version of the shared list as part of the synchronization process.

The synchronization service computing machine may handle the offline scenario by applying the set of change operations received from the first device to the updated version of the shared list to produce a new version of the shared list that merges the change operations from the first device and the second device. The synchronization service computing machine processes each set of change operations in the order in which they are received, and not necessarily the order in which they are initiated locally at a device. In other words, the set of change operations from the second device is processed by the synchronization service computing machine before the set of change operations from the first device is processed because the second device was online and the first device was offline. The processing algorithm causes the merged version of the shared list to maintain changes that are made by second device but that are not made by the first device, so that the final ordering of the shared list is merged based on the actions performed at both devices. In this way, a cohesive list aligned with the user's expectations may be produced.

Furthermore, once the merged version of the shared list is produced, the synchronization service computing machine may be configured to send the merged version of the shared list to all connected devices to synchronize the shared list between the devices. In other words, the merged version of the shared list may be stored at all devices and at the synchronization service computing machine.

Figure 2:
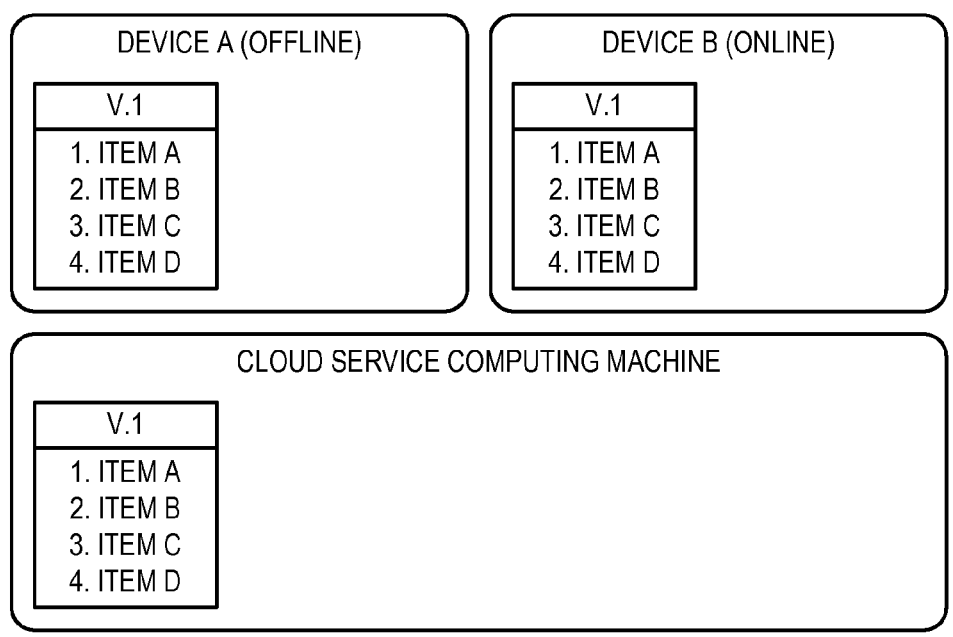
FIGS. 2-6 show an example scenario of synchronizing changes to a shared list of items between different devices in accordance with an embodiment of the present disclosure.

FIGS. 2-6 show an example scenario of synchronizing changes to a shared list between different devices and a synchronization computing service machine in accordance with an embodiment of the present disclosure. In FIG. 2, a first version of a shared list (V.1) is stored at the synchronization service computing machine, device A, and device B. The first version of the list includes four items ordered A, B, C, and D. Device A is not connected to the synchronization service computing machine (e.g., offline) and device B is connected to the synchronization service computing machine (e.g., online).

Figure 3:
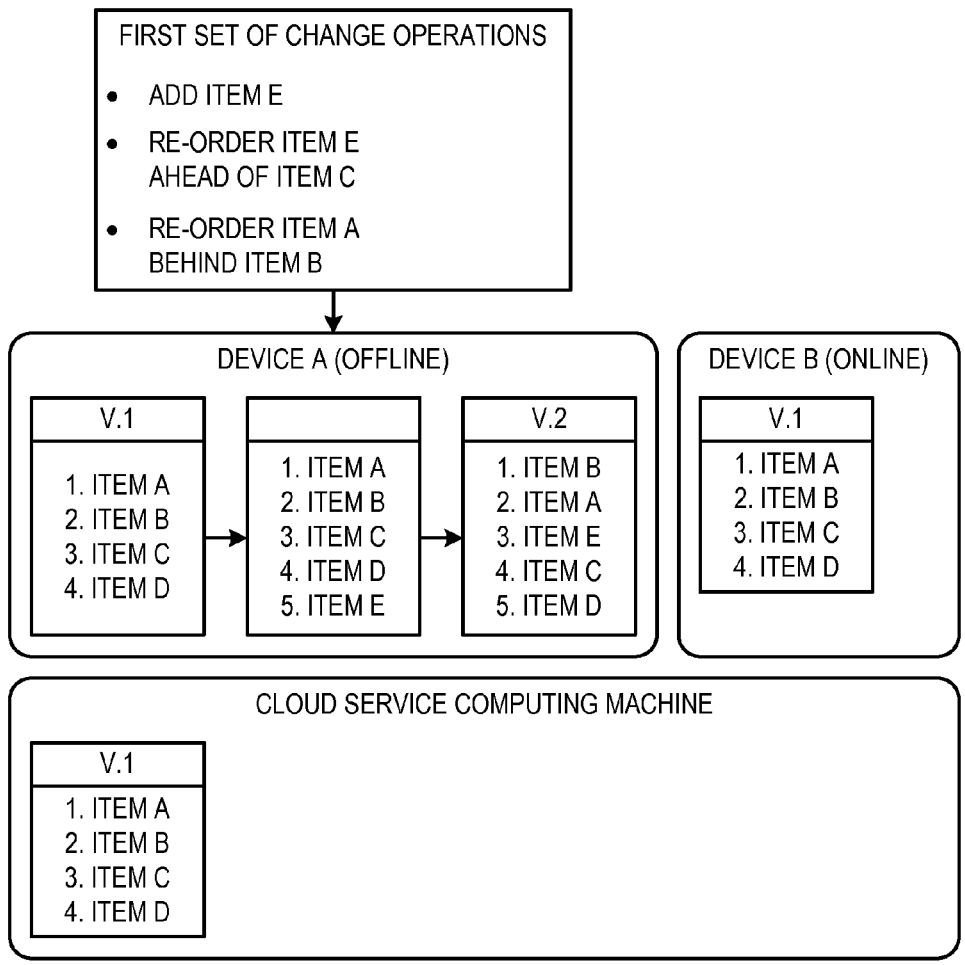

In FIG. 3, a first set of change operations is performed to the first version of the shared list locally at device A. The first set of change operations includes adding item E, re-ordering item E ahead of item C, and re-ordering item A behind item B. As discussed above, according to the processing algorithm, the add item operation is performed prior to the re-order item operations. In particular, item E is added to the end of the list, then item E is placed ahead of item C and item A is placed behind item B to produce a second version of the list (V.2) that includes five items ordered B, A, E, C, and D. Since device A is offline, the first set of change operations is not synchronized with the synchronization service computing machine, and further is not synchronized with device B.

Figure 4:
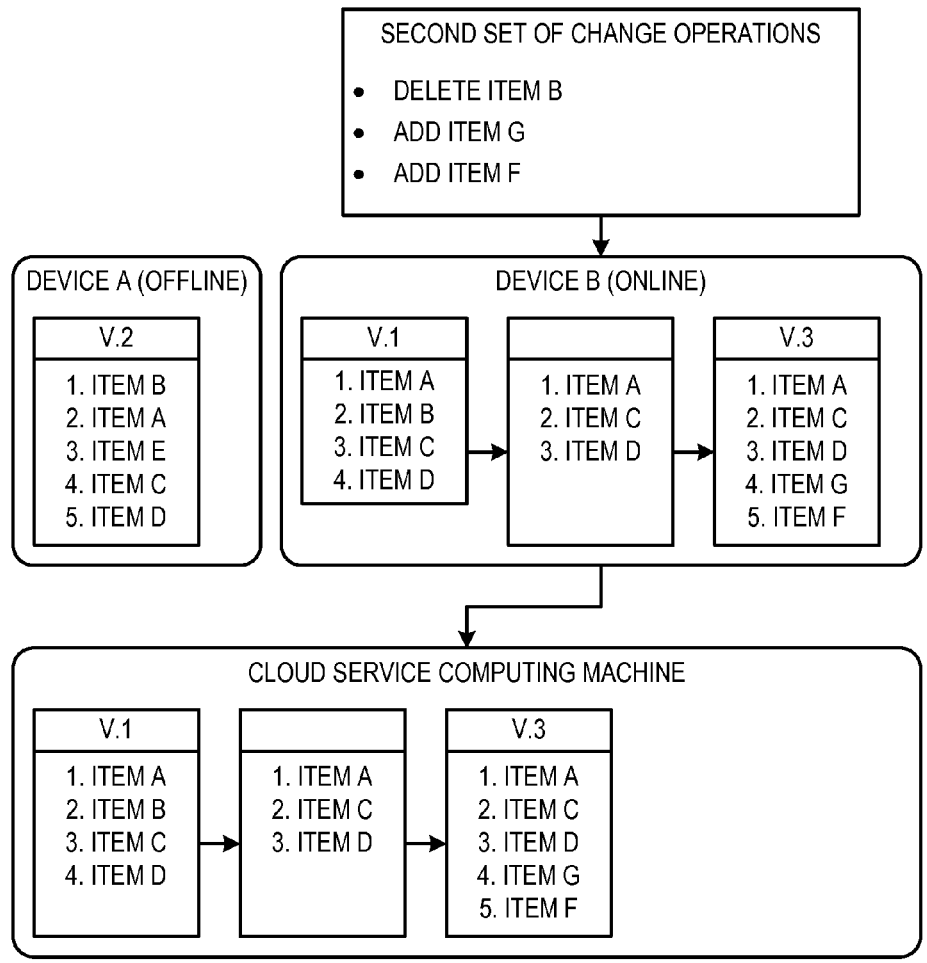

In FIG. 4, a second set of change operations is performed to the first version of the shared list locally at device B. The second set of change operations includes deleting item B, adding item G, and adding item F. As discussed above, according to the processing algorithm, the delete item operation is performed prior to the add item operations. In particular, item B is deleted, then item G is added to the end of the list and item F is added to the end of the list to produce a third version of the list (V.3) that includes five items ordered A, C, D, G, and F. Since device B is online, the second set of change operations is sent from device B to the synchronization service computing machine to synchronize the shared list, so that the third version of the shared list is stored at the synchronization service computing machine. Further, since device A is offline, the third version of the shared list is not synchronized with device A.

Figure 5:
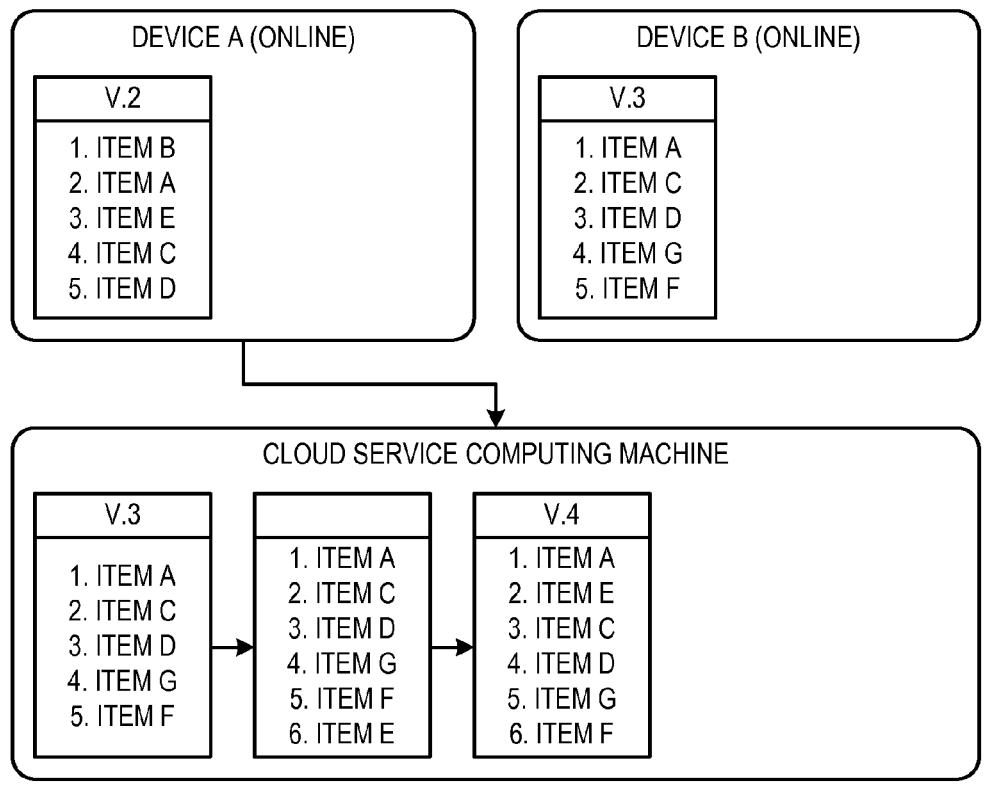

In FIG. 5, device A is connected to the synchronization service computing machine. In response to connecting with the synchronization service computing machine, device A sends the first set of change operations to the synchronization service computing machine. The synchronization service computing machine performs the first set of change operations to the third version of the shared list to produce a fourth version (V.4) of the shared list. In particular, item E is added to the end of the list, then item E is placed ahead of item C. Since item B has been deleted from the list, the re-order operation involving item B is ignored by the synchronization service computing machine. The synchronization service computing machine produces the fourth version of the list that includes six items ordered A, E, C, D, G, and F. The fourth version of the list maintains changes that are made by the first set of change operations but that are not made by the second set of change operations, so that the changes made by first and second sets of change operations may be merged together in order to align with the user's expectations.

Figure 6:
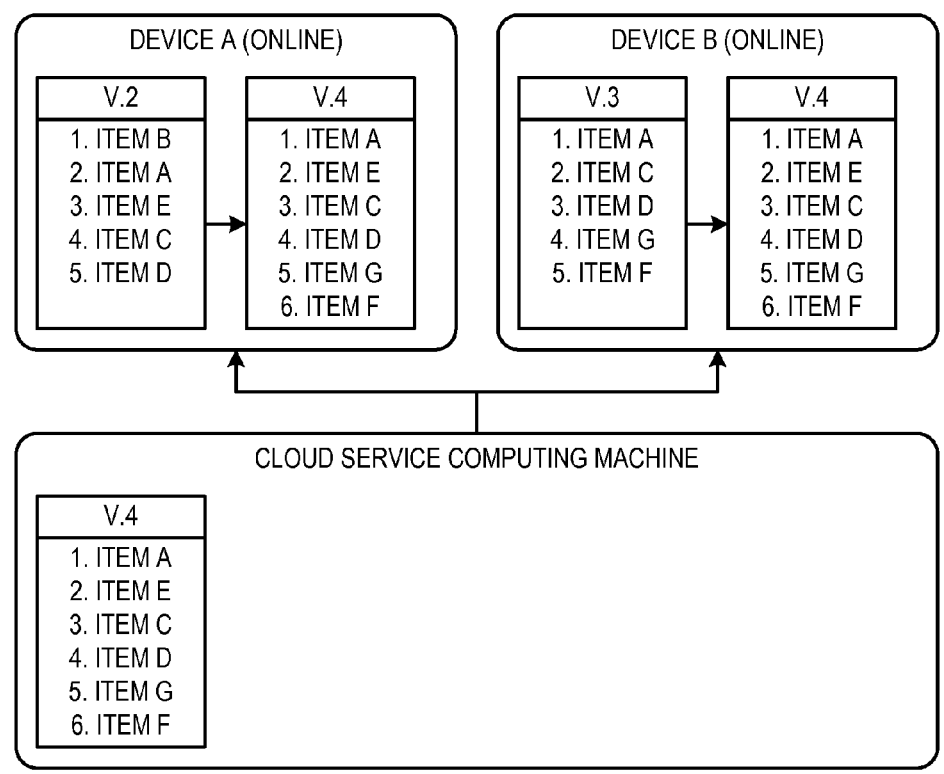

In FIG. 6, the synchronization service computing machine sends the fourth version of the shared list to device A and device B so that the shared list may be synchronized between all devices.

Figure 7:
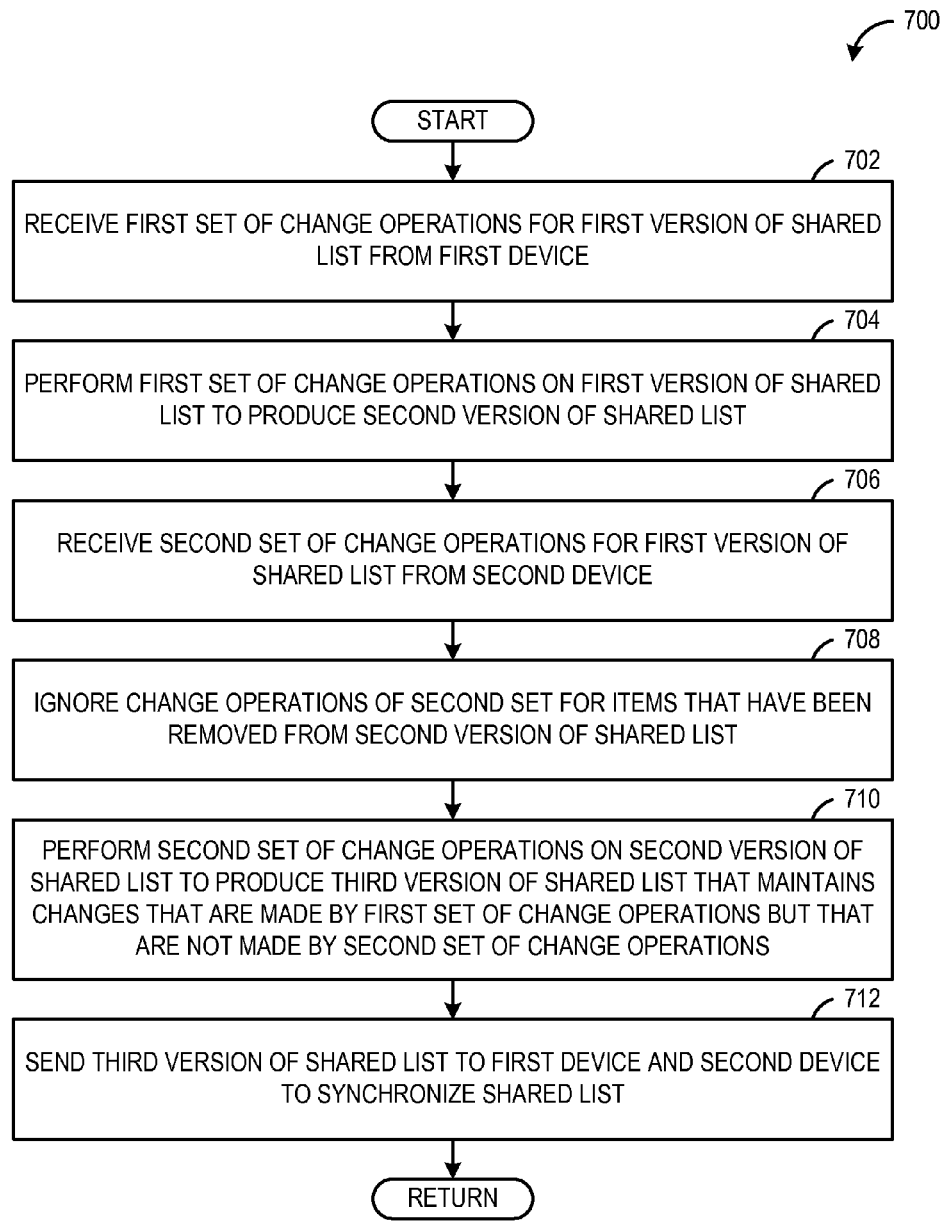
FIG. 7 shows a method of synchronizing changes to a shared list of items stored at a synchronization service computing machine in accordance with an embodiment of the present disclosure.

FIG. 7 shows a method 700 of synchronizing changes to a shared list of items stored at a synchronization service computing machine according to an embodiment of the present disclosure. For example, the method 700 may be performed by the synchronization service computing machine 104 shown in FIG. 1.

At 702, the method 700 may include receiving a first set of change operations for a first version of a shared list from a first device.

At 704, the method 700 may include performing the first set of change operations on the first version of the shared list to produce a second version of the shared list. Each of the change operations of the first set may be performed individually and in an order according to type. In particular, delete item operations may be performed prior to performing add item operations and re-order item operations, and add item operations may be performed prior to performing re-order item operations. In some embodiments, once the set of change operations is ordered according to type, each change operation of the set of change operations may be performed sequentially.

At 706, the method 700 may include receiving a second set of change operations for the first version of the shared list from a second device. For example, the second set of change operations may be for the first version of the shared list because the second set of change operations may have been performed locally at the second device while the second device was not connected to the synchronization service computing machine. As another example, the second set of change operations may have been sent to the synchronization service computing machine before the second device received the second version of the shared list.

At 708, the method 700 may include ignoring change operations of the second set of change operations for items that have been deleted from the second version of the shared list. For example, the first set of change operations may include a change operation to delete a designated item, and the second set of change operations may include a change operation for the designated item. Since the first set of change operations is performed before the second set of change operations is performed, the designated item is no longer in the list when the second set of change operations is performed and thus change operations for the designated item are no longer applicable.

At 710, the method 700 may include performing the second set of change operations on the second version of the shared list to produce a third version of the shared list that maintains changes that are made by the first set of change operations but that are not made by the second set of change operations. In particular, the third version of the list may include at least some change operations of the first set of change operations and at least some change operations of the second set of change operations.

At 712, the method 700 may include sending the third version of the shared list to the first device and the second device to synchronize the shared list between all devices connected to the synchronization service computing machine.

By performing sets of change operations in the order in which they are received from different devices and performing each change operation within a set of change operations individually, add and delete operation from multiple devices may be taken into account and handled effectively. In this way, a cohesive list aligned with the user's expectations may be produced.

Figure 8:
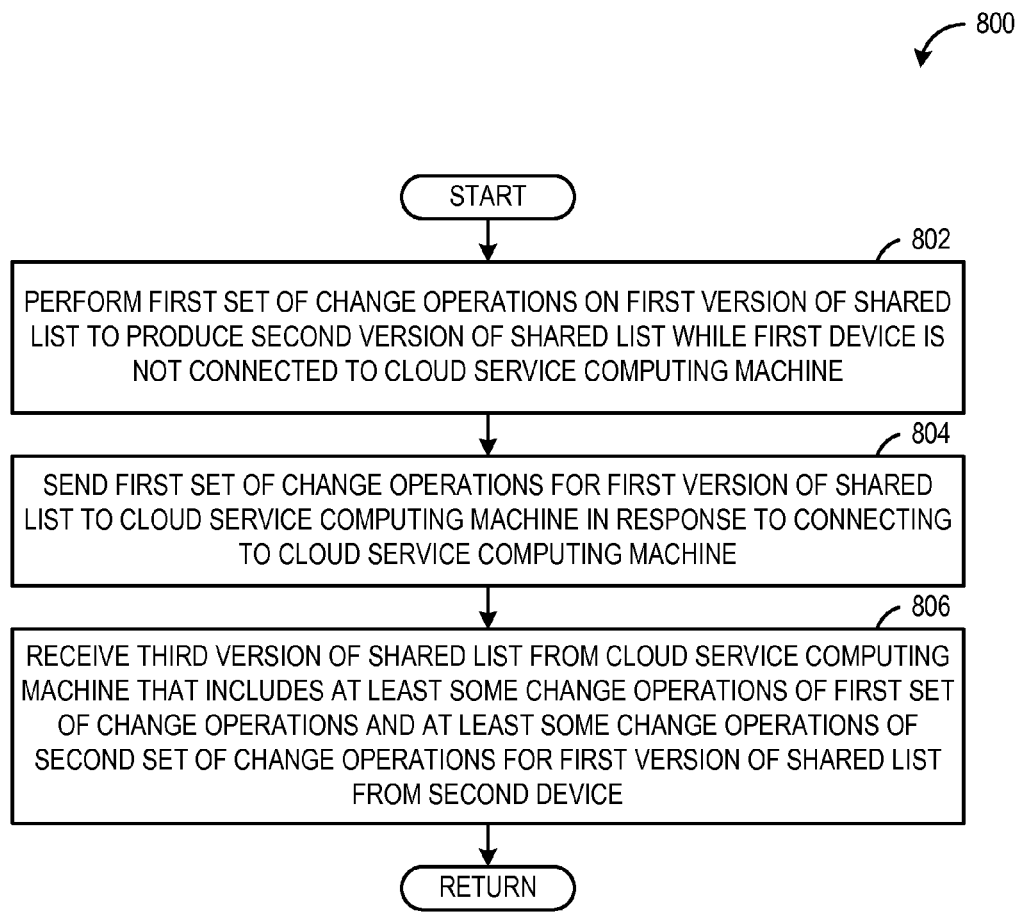
FIG. 8 shows a method of synchronizing a shared list of items between different devices in accordance with an embodiment of the present disclosure.

FIG. 8 shows a method 800 of synchronizing changes to a local version of a shared list of items stored at a first device with an online version of the shared list of items stored at a synchronization service computing machine according to an embodiment of the present disclosure. For example, the method 800 may be performed by a client device of the plurality of client devices 106 shown in FIG. 1.

At 802, the method 800 may include performing a first set of change operations on a first version of the shared list to produce a second version of the shared list while the first device is not connected to the synchronization service computing machine.

At 804, the method 800 may include sending the first set of change operations for the first version of the shared list to the synchronization service computing machine in response to connecting to the synchronization service computing machine.

At 806, the method 800 may include receiving a third version of the shared list from the synchronization service computing machine. The third version of the shared list includes at least some change operations of the first set of change operations and at least some change operations of a second set of change operations for the first version of the shared list from a second device.

The above described method may allow for change operations that are performed while a device is offline to be merged into a shared list with change operations from a different device so the shared list may be synchronized with changes from both devices.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
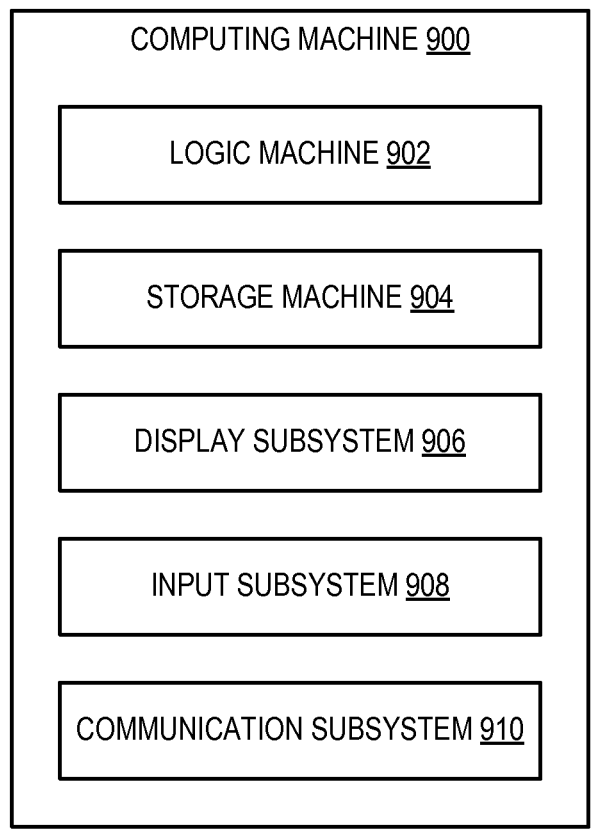
FIG. 9 shows a computing system in accordance with an embodiment of the present disclosure.

FIG. 9 schematically shows a non-limiting embodiment of a computing system 900 that can enact one or more of the methods and processes described above. For example, computing system 900 may be representative of a client device of the plurality of client devices 106 or the synchronization service computing machine 104 shown in FIG. 1. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 904 includes one or more physical devices configured to hold instructions executable by the logic machine to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 906 may be used to present a visual representation of data held by storage machine 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of synchronizing changes to a shared list of items stored at a synchronization service computing machine, the method comprising:
    receiving a first set of change operations for a first version of the shared list from a first device;
    performing the first set of change operations on the first version of the shared list to produce a second version of the shared list;
    receiving a second set of change operations for the first version of the shared list from a second device, the first set of change operations including one or more change operations that are not included in the second set of change operations and the second set of change operations including one or more change operations that are not included in the first set of change operations; and
    performing the second set of change operations on the second version of the shared list to produce a third version of the shared list that maintains changes that are made by the first set of change operations.

2. The method of claim 1, further comprising:
    ignoring change operations of the second set of change operations for items that have been deleted from the second version of the shared list.

3. The method of claim 1, further comprising:
    sending the third version of the shared list to the first device and the second device to synchronize the shared list.

4. The method of claim 1, wherein the first set of change operations or the second set of change operations include one or more of a delete item operation, an add item operation, and a re-order item operation, and the method further comprises:
    for each set of change operations, performing delete item operations prior to performing add item operations and re-order item operations, and performing add item operations prior to performing re-order item operations.

5. The method of claim 4, wherein performing the add item operation includes adding an item to an end of the shared list.

6. The method of claim 4, wherein performing the re-order item operation on an item of the shared list includes placing the item after a designated item or placing the item before a designated item in the shared list.

7. The method of claim 1, wherein each change operation of a set of change operations is performed individually.

8. The method of claim 1, wherein the first set of change operations is performed locally at the first device when the first device is connected to the synchronization service computing machine, the second set of change operations is performed locally at the second device when the second device is not connected to the synchronization service computing machine, and the second set of change operations is received in response to the second device connecting to the synchronization service computing machine, and wherein the first set of change operations and the second set of change operations are performed in an order in which they are received at the synchronization service computing machine.

9. The method of claim 1, wherein the shared list is a shared playlist and the items are music tracks or music videos.

10. A method of synchronizing a local version of a shared list of items stored at a first device with an online version of the shared list of items stored at a synchronization service computing machine, the method comprising:
    performing a first set of change operations on a first version of the shared list to produce a second version of the shared list while the first device is not connected to the synchronization service computing machine;
    sending the first set of change operations for the first version of the shared list to the synchronization service computing machine in response to connecting to the synchronization service computing machine; and
    receiving a third version of the shared list from the synchronization service computing machine, the third version of the shared list including at least some change operations of the first set of change operations performed by the synchronization service computing machine and at least some change operations of a second set of change operations for the first version of the shared list from a second device performed by the synchronization service computing machine, wherein the at least some change operations of the first set of change operations differ from the at least some change operations of the second set of change operations.

11. The method of claim 10, wherein the first set of change operations and the second set of change operations are performed in an order in which they are received at the synchronization service computing machine.

12. The method of claim 10, wherein the third version of the shared list maintains changes that are made by the first set of change operations.

13. The method of claim 10, wherein the first set of change operations or the second set of change operations include one or more of a delete item operation, an add item operation, and a re-order item operation.

14. The method of claim 10, wherein the shared list is a shared playlist and the items are music tracks or music videos.

15. A method of synchronizing changes to a shared list of items stored at a synchronization service computing machine, the method comprising:
- receiving a first set of change operations for a first version of the shared list from a first device, the first set of change operations being made while the first device is connected to the synchronization service computing machine;
- performing the first set of change operations on the first version of the shared list to produce a second version of the shared list;
- receiving a second set of change operations for the first version of the shared list from a second device, the second set of change operations being made while the second device is not connected to the synchronization service computing machine, the first set of change operations including one or more change operations that are not included in the second set of change operations and the second set of change operations including one or more change operations that are not included in the first set of change operations; and
- performing the second set of change operations on the second version of the shared list to produce a third version of the shared list that maintains changes that are made by the first set of change operations.

16. The method of claim 15, further comprising:
ignoring change operations of the second set of change operations for items that have been deleted from the second version of the shared list.

17. The method of claim 15, further comprising:
sending the third version of the shared list to the first device and the second device to synchronize the shared list.

18. The method of claim 15, wherein the first set of change operations or the second set of change operations include one or more of a delete item operation, an add item operation, and a re-order item operation, and the method further comprises:
for each set of change operations, performing delete item operations prior to performing add item operations and re-order item operations, and performing add item operations prior to performing re-order item operations.

19. The method of claim 18, wherein performing the add item operation includes adding an item to an end of the shared list, and performing the re-order item operation on an item of the shared list includes placing the item after a designated item or placing the item before a designated item in the shared list.

20. The method of claim 15, wherein the shared list is a shared playlist and the items are music tracks or music videos.

* * * * *